United States Patent [19]

Purchase et al.

[11] Patent Number: 5,029,110
[45] Date of Patent: Jul. 2, 1991

[54] AUTOMATIC DATA PLOTTER

[75] Inventors: Rex H. Purchase, Weymouth; Philip A. Strong; Michael J. Roberts, both of Portland, all of England

[73] Assignee: The Secretary of State for Defence in Her Britannic Majesty's Government of the United Kingdom of Great Britain and Northern Ireland, London, England

[21] Appl. No.: 523,717

[22] Filed: May 4, 1990

Related U.S. Application Data

[63] Continuation of PCT GB88/00716 filed Sep. 1, 1988, published as WO89/02115 on Mar. 9, 1989.

[30] Foreign Application Priority Data

Sep. 4, 1987 [GB] United Kingdom ............... 8720879

[51] Int. Cl.$^5$ ............................................. G60K 15/00
[52] U.S. Cl. ..................................... 364/520; 364/200
[58] Field of Search .................................. 364/518–520, 364/237.7 MS File, 929.3 MS File, 267 MS File, 265 MS File, 943.9 MS File, 945 MS File; 371/12, 15.1, 16.4, 29.1

[56] References Cited

U.S. PATENT DOCUMENTS 4,745,602 5/1988 Morrell ............................. 371/14

Primary Examiner—Arthur G. Evans
Attorney, Agent, or Firm—Nixon & Vanderhye

[57] ABSTRACT

An automatic data plotting apparatus consists of three main parts: a processor; a serial and parallel interface; and a plotter. The plotter is a flat-bed X-Y plotter. The data processor is programmed to handle one or more data inputs and instruct the plotter to record information relating to the data inputs on a plot. The processor translates the incoming data into times, bearings, tracks and any other characteristics. A pause facility is provided to suspend plotting, the incoming data being stored in a data store while the pause facility is in operation and being recorded on the plot when the pause is discontinued. An automatic data plotting apparatus provides a focal point at which incoming information can be co-ordinated and displayed. The displayed information can then be evaluated and/or stored for later analysis.

8 Claims, 1 Drawing Sheet

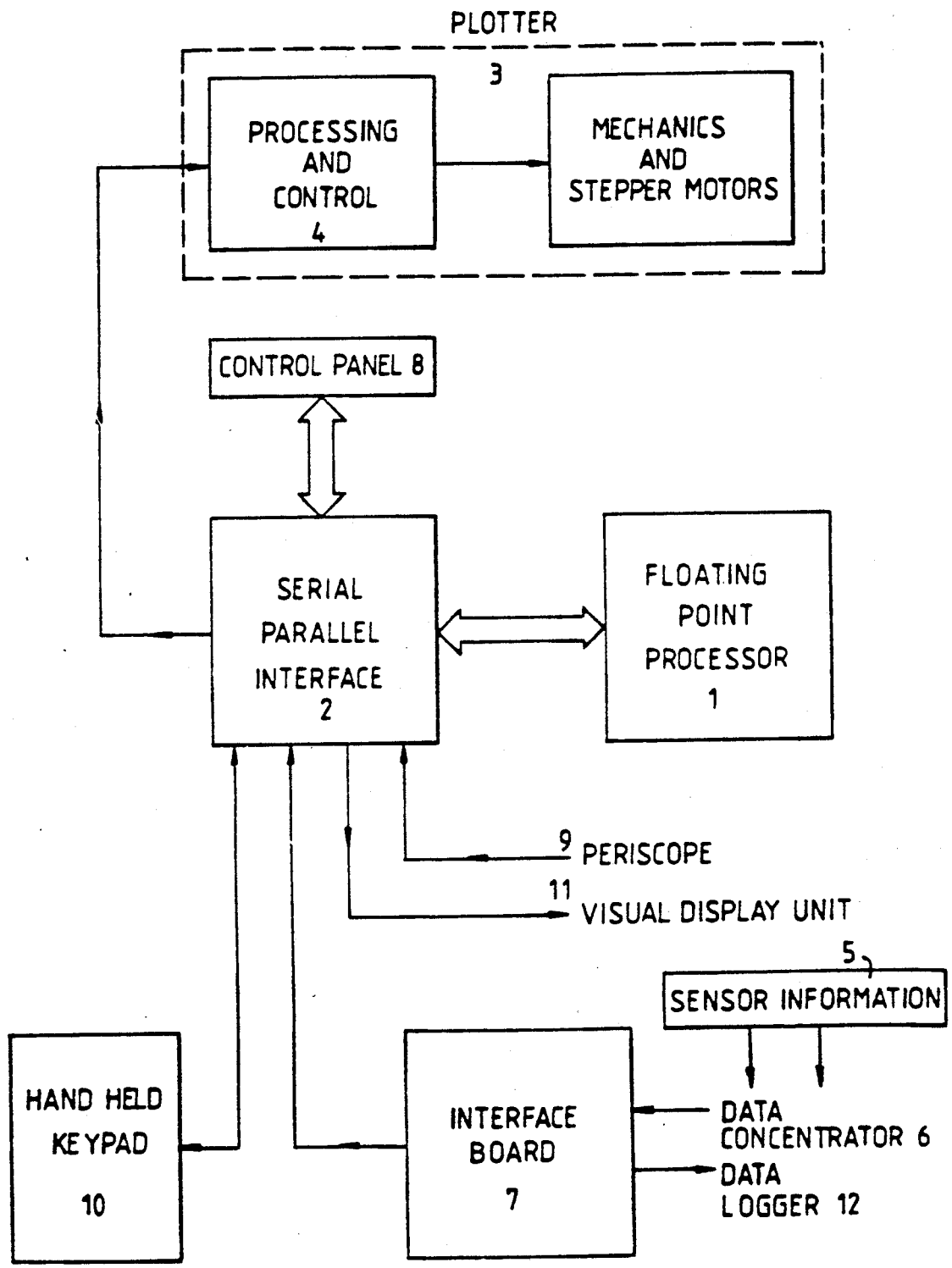

AUTOMATIC DATA PLOTTER

This application is a continuing application under 35 USC 363 of International Application No. PCT/GB88/00716 filed Sept. 1, 1988, published as WO89/02115 as Mar. 9, 1989.

BACKGROUND OF THE INVENTION

1. Field of the Invention

The invention relates to equipment for plotting data received from various types of sensors as a graphical representation. It relates primarily, but not exclusively, to automatic data plotters which display data relating to own vessel, such as ship or submarine, and any contacts detected by sensors. These plotters are known as contact evaluation plotters.

2. Discussion of Prior Art

A contact evaluation plotter provides a focal point at which incoming information is co-ordinated and displayed. The displayed information can then be evaluated and/or stored for later analysis.

The contact evaluation plotter is particularly valuable in a submarine at sea where it provides a vital link between all the sensors and the command.

The contact evaluation plotter can plot information received from a wide variety of sensors such as sonar, radar, periscope, weather satellites etc.

The original contact evaluation plotters were manual. The sensor operators communicate the sensor information by voice to the contact evaluation plotter operator who then plots the information by hand on plots of time against bearing. A very high level of manning is required and as the rate of incoming data has risen with the use of more modern equipment it has become impossible for the operator to plot fast enough.

To overcome these problems an automatic contact evaluation plotter was introduced, based on a typewriter plotter. However, though faster than manual plotters, these automatic plotters have problems of their own. They have limited information handling and display capabilities, there is no facility for annotation of plots in real time and it is difficult to access earlier plots.

Video displays are also increasingly used for contact evaluation, with hard copy being obtainable if required, but there are many reasons why paper contact evaluation plotters will continue to be of use as they have many advantages such as ease of use and annotation, accessibility, user confidence and the size and resolution of the display.

An alternative type of plotter which is available is the flatbed X-Y type. These are designed for draughting in laboratory or office environments and use a pen moved over a stationary bed by a combination of movements in two orthogonal directions. Built in microprocessor control enables commands such as "draw circle", "print ABC" to be "understood" and carried out.

The pen can be driven to any point on the bed and can draw lines, arcs etc in any direction. Characters, however, must be drawn, which makes text generation much slower than a typewriter-type machine.

These plotters are however unsuitable for use as contact evaluation plotters for a number of reasons, the most important being that they are not provided with any inbuilt data processing capability. Further they are not equipped to deal with inputs from several sensors and they are not robust enough for use on vessels.

SUMMARY OF THE INVENTION

After extensive investigation the inventors have determined that there are a number of attributes that it is desirable for a contact evaluation plotter to possess:

It should be fairly small-this is essential for use on submarines where space is at a premium and is also advantageous for other uses; It should be robust to survive the rigours of, for example, shipboard use;

It should be easy to use;

It should be easy to view the plots and it is desirable that several people should be able to view the plot at one time;

It should be capable of plotting data from several sensor inputs;

It should allow real time annotation and also be easy to annotate by hand;

There should be flexibility in the scales used, information recorded and annotation facilities;

A reasonable amount of the plot should be visible at any one time; and

The paper should move only infrequently and must display on some kind of flat surface.

This last requirement means that none of the typwriter-like plotters, including drum plotters, where paper movement provides one axis of pen travel are suitable and thus a plotter of the flat-bed-X-Y type would be more desirable.

Thus the object of the invention is to provide an improved automatic data plotter for use as contact evaluation plotter, that possesses at least some of the attributes mentioned above.

The invention provides an automatic data plotting apparatus comprising a data processor and a flatbed X-Y plotter the data processor being programmed to handle one or more data inputs and instruct the plotter to record information relating to the data inputs on a plot characterised in that the processor is programmed to monitor incoming data for errors and a pause facility is provided to suspend plotting, the incoming data being stored in a data store while the pause facility is in operation and being recorded on the plot when the pause is discontinued.

Preferably an interface, advantageously a serial and parallel interface is provided to interface the processor to the plotter. Together the processor and the interface comprise what will be referred to as the data processing computer.

Preferably the processor is programmed to enable the plotter to use one of a number of separate banks of pens at a time. Conveniently two banks are used and the plotter can be switched to either of them. Preferably the processor is programmed to enable the plotter to plot scales, times or any other desired plot information.

Preferably an exterior keypad is provided from which annotation messages can be sent to the plotter for writing on the plot. Conveniently this may have a number of programmed messages and a facility to type in any desired message.

Preferably the processor is programmed to decode incoming data such as sensor data and environmental data, for example speed and weather conditions, and instruct the plotter to record their details.

Preferably the plotter is adapted to allow a continuous roll of paper to be used. Preferably a number of different time scales can be selected and advantageously the processor is programmed to enable annotation messages to be positioned at any desired point on the plot.

Advantageously heat sinks or cooling fans are provided to ensure that the processor and plotter do not overheat when used in inadequately ventilated areas.

BRIEF DESCRIPTION OF THE DRAWING

The invention will now be described by way of example only with reference to the drawing which shows a schematic block diagram of an automatic contact evaluation plotter.

DETAILED DESCRIPTION OF PREFERRED EMBODIMENTS

The apparatus consists of three main parts: A processor 1; a serial and parallel interface 2; and a plotter 3. The plotter is a flat-bed X-Y plotter. As it is desirable to keep the apparatus as small as possible an A3 size plotter is used.

The plotter's own microprocessor 4 handles character and arc generation and provides automatic suppression of off-bed plotting and calculation of re-entry points. The microprocessor 4 allows a high level interface to be used between the processor 1 and the plotter 3.

The processor 1 has its programs contained in EPROMS and it communicates with the outside world via the serial and parallel interface 2.

Sensor information 5 (from sonar, ship's log etc) is channelled by an external data concentrator 6 (which is not part of the contact evaluation plotter) through an interface 7 to the serial parallel interface 2 and thence to the processor 1. Commands to drive the plotter 3 are passed through the interface 2 to the plotter 3 where the plotter's processing and control microprocessor 4 drives stepper motors to move a pen on a plot (not shown).

The parallel part of the interface 2 reads switch lines from switches on a control panel 8, sited on the plotter 3, and from periscope cut lines 9. It also drives indicators on the control panel 8.

The processor 1 is a floating point processor.

A specially adapted external keypad 10 is connected to the interface 2. This allows messages to be annotated onto the plot. Certain messages are programmed in to a specific key or the message can be typed in using alphanumeric characters.

The data can also be viewed on a video display unit 11, or output to a data logger 12.

When used in a submarine the data processor 1 interfaces with sonars and ship's log (from sensors 5), keypad 10 and periscope data 9. The plotter 3 records all the data transactions of the processor 1.

A number of facilities are programmed into the processor 1.

The plotter 3 has a bank of pens in a pen stall arrangement which can hold up to ten pens. The processor 1 is programmed to treat this as two separate banks, for example two banks of 4 or 5 pens. A switch on the control panel enables the bank in use to be switched from one to the other. This makes changing the pens very simple even when the plotter is running. This is particularly important when the plotter 3 is used vertically as in that position the pens are horizontal and so tend to dry out more quickly than when the plotter 3 is used horizontally.

The processor 1 is programmed to include routines for calling up the sensor information and checking it for errors. The plotter is then instructed to print the symbols and information appropriate to the data.

All the incoming data is checked for data type, format errors, stream errors, invalid parameters and any other identifying data. The error detection routine checks incoming data and annotates any plot that is found to be in error.

If the sonar data inputs become non-synchronised in their inputs to the processor 1 they can be resynchronised via the data-concentrator 6 or switched out as necessary. Any contact which is out of synchronisation for more than a specified period of time will not be plotted, but an error will be indicated.

The programs in the processor 1 have to translate the incoming data into times, bearings, tracks and any other characteristics. A program enables the pens to be changed to provide different colour plots and for various symbols to be drawn. It drives the pen movement to draw symbols, characters and tracks; plots scales, margins, times, bearings; annotates the plot to identify tracks, insert messages, record environmental data; and, in short, to provide all the plotting controls necessary to achieve the desired information on the plot.

The program further enables a pause facility to be used. When the Pause is switched in plotting is suspended. This enables the whole plot to be viewed or annotated manually if desired. When Pause is in operation all the incoming data is stored in a buffer. The size of the buffer is controlled by the program but could, for example, be 10 minutes. When Pause is switched off the plotter catches up on the stored data and then continues with real time plotting.

A switch is provided on the control panel 8 to enable the intensity of control panel indicators to be dimmed or brightened.

The operation of an automatic contact evaluation plotter will now be described, in relation to its use in a submarine.

The plot is produced on specially printed paper, to improve the presentation and readability of the data. The vessel's own heading track is drawn as a solid line. A box can be drawn next to the track to hold data on speed and/or depth as required. A plot of 360° is used and four inputs are processed, corresponding to four types of sonar, each capable of passing tracks to the plotter. Any combination of sonars may be selected for plotting and the plot may also include periscope cuts.

Banks of 1-4 and 5-8 or 1-5 and 6-10 can be programmed in for the pens. The pens used are:
1. Ship's heading
2. Data, annotation and error logs
3. Contact tracks
4. Time, margin and bearings.

There are facilities to switch between three different timescales, two different up-date rates, and either of the banks of pens. The timescales are 2,5 or 10 minutes per inch and any change is indicated automatically on the plot. The update rates are 30 seconds or 2 minutes.

The paper is advanced automatically and a manual paper advance is also provided.

The indicator lamps can be dimmed.

The plot can be annotated using a remote keypad. This has a number of predefined programmed keys e.g. for mast up, mast down, torpedo etc. It also has a free text mode where any message of alphanumeric characters in 3 lines of 12 characters can be typed in. Time and bearing positions for the message can be defined. Default values of current time and bearing operate if none are input.

The keypad data is sent as a standard data stream so simple software changes and a new overlay on the pad would allow a new set of messages to be programmed to the keys.

The keypad has a liquid crystal display to show the message before it is sent to the plotter. Programmed messages may have prompts for data to be filled in for plotting e.g. range and angle of a visual contact. Plotting of contact information has priority over annotation messages. Hence, the keypad messages will be stored in memory and written onto the plot as soon as possible.

The carriage can be held on "pause". When Pause is operated the plotter finishes writing the item of data it is processing before pausing. Plotting is restricted to a window of 4" at the top of the plot. When this window is full, the paper is moved downwards automatically.

Once the trackers are activated by the sonar operators, their bearings are plotted automatically on the contact evaluation plotter every 30 seconds, or 2 minutes as selected. The sonar operators have a manual cursor and the bearing of this may also be cut through to the contact evaluation plotter. The contact evaluation plotter will automatically plot cuts from the search and attack periscopes, via an external convertor or it may be included in the sonar data stream.

The plotter is packed in a metal base to make it more robust and additional power supplies and cooling are provided.

The combination of hardware and software of the contact evaluation plotter of the invention has allowed the creation of an "intelligent" plotter which can run non-stop for long periods of time. The equipment is robust and can run non-stop for long periods of time.

The submarine application is one particular use of the invention. With minor modification it can be used with other sensors or on other platforms, including surface ships.

We claim:

1. Automatic data plotting apparatus comprising: a data processor; and a flatbed X-Y plotter said data processor comprising a means, responsive to at least one data input, for instructing said plotter to record information relating to the data inputs on a plot wherein said processor further includes means for monitoring incoming data for errors and a means for pausing and for suspending plotting upon one of error occurence, viewing of data, and manual annotation of data, and a means for storing said incoming data in a data store while said means for pausing is in operation and for recording said data on said plot when said means for pausing is inoperative.

2. Automatic data plotting apparatus according to claim 1 wherein the processor is programmed to enable the plotter to use one of a number of separate banks of pens at a time.

3. Automatic data plotting apparatus according to claim 2 wherein two banks of pens are used and the plotter can be switched to either of them.

4. Automatic data plotting apparatus according to claim 1 wherein an exterior keypad is provided from which annotation messages can be sent to the plotter for writing on the plot.

5. Automatic data plotting apparatus according to claim 1 wherein the processor is programmed to decode incoming data such as sensor data and environmental data, for example speed and weather conditions, and instruct the plotter to record their details.

6. Automatic data plotting apparatus according to claim 1 wherein a number of different time scales can be selected.

7. Automatic data plotting apparatus according to claim 1 wherein the processor is programmed to enable annotation messages to be positioned at any desired point on the plot.

8. Automatic data plotting apparatus according to claim 1 wherein at least one of heat sinks and cooling fans are provided to ensure that the processor and plotter do not overheat when used in inadequately ventilated areas.

* * * * *